US006880851B1

United States Patent
Summers et al.

(10) Patent No.: US 6,880,851 B1
(45) Date of Patent: Apr. 19, 2005

(54) HAND CART

(75) Inventors: Deborah D. Summers, Pataskala, OH (US); Lillian M. Lyle, Pataskala, OH (US); Sharon L. Buccilla, Pickerington, OH (US)

(73) Assignees: Deborah Dale Summers, Pataskala, OH (US); Lillian Marie Lyle, Pataskala, OH (US); Sharon Qucuilla, Pickerington, OH (US)

( * ) Notice: Subject to any disclaimer, the term of this patent is extended or adjusted under 35 U.S.C. 154(b) by 1 day.

(21) Appl. No.: 10/259,928

(22) Filed: Sep. 27, 2002

(51) Int. Cl.[7] .............................................. B62B 1/04
(52) U.S. Cl. ..................... 280/652; 280/43.1; 280/47.27
(58) Field of Search ...................... 280/47.26, 47.652, 280/33.991, 38, 40, 43.1, 43.11, 645, 651, 652, 654, DIG. 3, 639; 211/88.01, 170, 171, 204; 220/6, 7

(56) References Cited

U.S. PATENT DOCUMENTS

| | | | | |
|---|---|---|---|---|
| 894,561 A | * | 7/1908 | Wood | 211/170 |
| 1,718,962 A | * | 7/1929 | Kimball | 280/655 |
| 2,141,881 A | * | 12/1938 | Schray | 280/651 |
| 2,212,053 A | * | 8/1940 | Smith | 280/651 |
| 2,277,332 A | * | 3/1942 | Lamb | 211/196 |
| 2,582,435 A | | 1/1952 | Howard | |
| 2,775,464 A | * | 12/1956 | Williamson | 280/38 |
| 3,041,026 A | * | 6/1962 | Wilson | 248/98 |
| 3,348,857 A | | 10/1967 | Rollin | |
| 3,749,253 A | * | 7/1973 | Carter | 211/171 |
| 3,874,546 A | * | 4/1975 | Sander et al. | 220/6 |
| 4,040,642 A | * | 8/1977 | David | 280/654 |
| 4,049,284 A | * | 9/1977 | Capper | 280/47.18 |
| 4,355,818 A | * | 10/1982 | Watts | 280/654 |
| 4,429,897 A | | 2/1984 | Friedman et al. | |
| 4,934,718 A | | 6/1990 | Voegele | |
| D333,543 S | | 2/1993 | Rodriguez | |
| 5,203,815 A | * | 4/1993 | Miller | 43/21.2 |
| 5,626,352 A | * | 5/1997 | Grace | 280/47.29 |
| 5,678,842 A | * | 10/1997 | Hook et al. | 280/646 |
| 5,697,624 A | * | 12/1997 | Faraj | 280/47.19 |
| 6,053,515 A | | 4/2000 | Kelley | |
| 6,082,757 A | * | 7/2000 | Lin | 280/654 |
| 2002/0089134 A1 | * | 7/2002 | Salzberger et al. | 280/47.24 |

* cited by examiner

Primary Examiner—Christopher P. Ellis
Assistant Examiner—Kelly E Campbell

(57) ABSTRACT

A hand cart for facilitating moving of groceries to a desired location. The hand cart includes a frame assembly comprising a pair of side members and a handle member. The handle member extends between the side members and is griped by hands of the user for moving the frame assembly across a surface. A plurality of wheels are rotatably coupled to the side members of the frame assembly for rolling across the surface for facilitating movement of the frame assembly across the surface. A lower shelf assembly is hingably coupled to the frame assembly opposite the handle member of the frame assembly. The lower shelf assembly is pivotal between a deployed position and a stored position. The lower shelf assembly is designed for receiving groceries for facilitating transportation of the groceries across the surface by the user when the lower shelf assembly is in the deployed position.

13 Claims, 4 Drawing Sheets

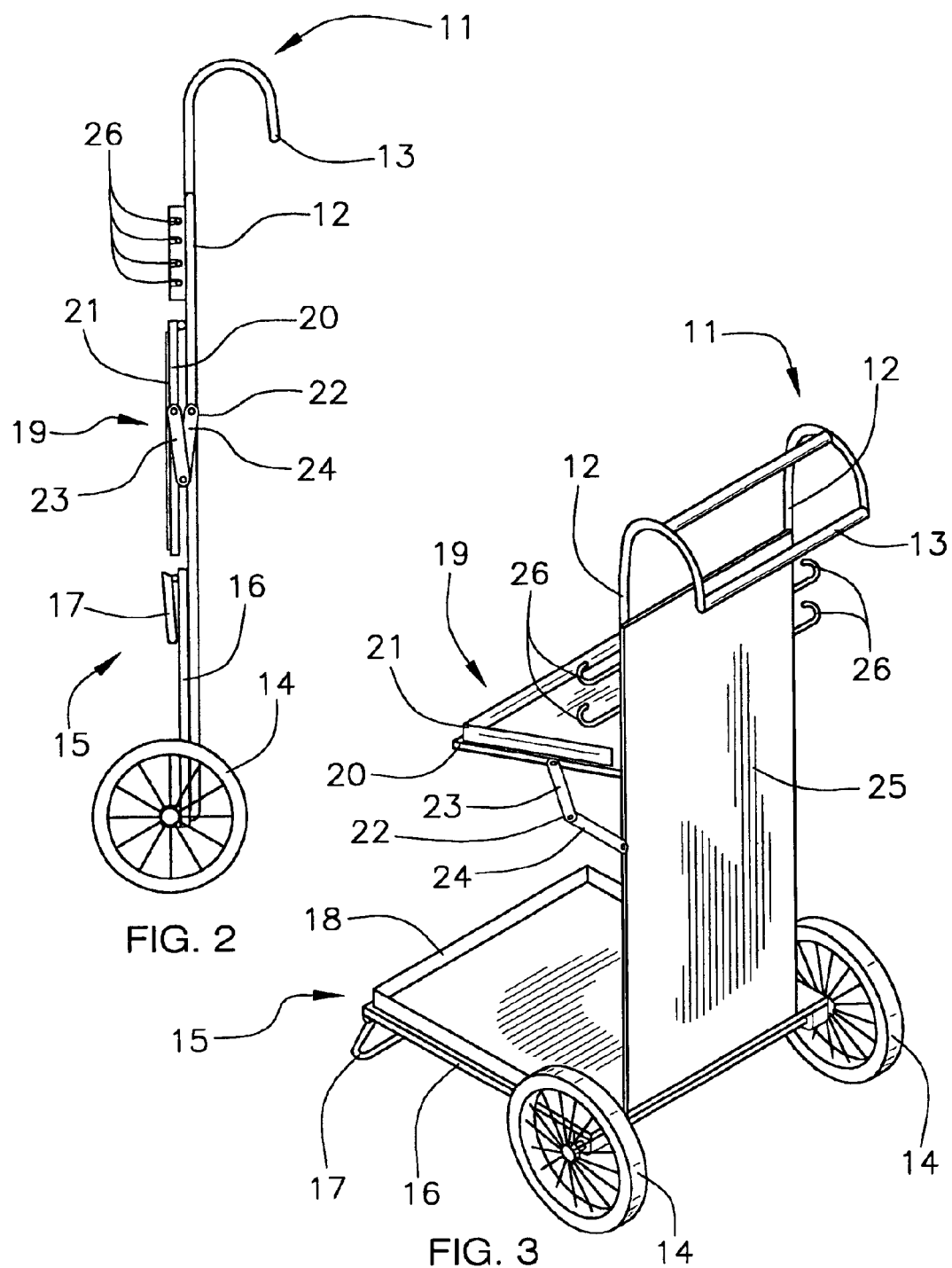

HAND CART

BACKGROUND OF THE INVENTION

1. Field of the Invention

The present invention relates to hand trucks and more particularly pertains to a new hand cart for facilitating moving of groceries to a desired location.

2. Description of the Prior Art

The use of hand trucks is known in the prior art. U.S. Pat. No. 6,053,515 describes a device for facilitating moving of articles from one location to another. Another type of hand truck is U.S. Pat. No. 4,934,718 having a hand truck that is convertible to a utility table. U.S. Pat. No. 4,429,897 has a dolly with wheels that are adjustable to a variety of terrain. U.S. Pat. No. 3,348,857 has a cart that is convertible between rolling and carrying the cart. U.S. Pat. No. 2,582,435 has a wheeled carrier that is convertible to carry a variety of different objects. U.S. Pat. No. Des. 333,543 shows a hand truck.

While these devices fulfill their respective, particular objectives and requirements, the need remains for a device that has certain improved features that inhibit groceries from slipping off of the hand cart.

SUMMARY OF THE INVENTION

The present invention meets the needs presented above by providing a containment wall of the lower shelf assembly to inhibit the groceries from slipping off of the platform member when the groceries are being moved to a desired location.

Still yet another object of the present invention is to provide a new hand cart that allows a user to move all their groceries in a single trip from the vehicle to the house.

Even still another object of the present invention is to provide a new hand cart that is can be easily stored in the trunk of a vehicle when the upper shelf assembly and the lower shelf assembly are in the stored position.

To this end, the present invention generally comprises a frame assembly comprising a pair of side members and a handle member. The handle member extends between the side members. The handle member is designed for being griped by hands of the user for moving the frame assembly across a surface. A plurality of wheels are rotatably coupled to the side members of the frame assembly. The wheels is designed for rolling across the surface for facilitating movement of the frame assembly across the surface when the frame assembly is being moved by the user. A lower shelf assembly is hingably coupled to the frame assembly opposite the handle member of the frame assembly. The lower shelf assembly is pivotal between a deployed position defined by the lower shelf assembly being positioned substantially perpendicular to the frame assembly and a stored position defined by the lower shelf assembly being positioned substantially parallel to the frame assembly. The lower shelf assembly is designed for receiving groceries for facilitating transportation of the groceries across the surface by the user when the lower shelf assembly is in the deployed position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side view of the present invention with the upper shelf assembly and the lower shelf assembly each in the stored position.

FIG. 3 is a rear perspective view of the present invention.

DESCRIPTION OF THE PREFERRED EMBODIMENT

Figure 1:
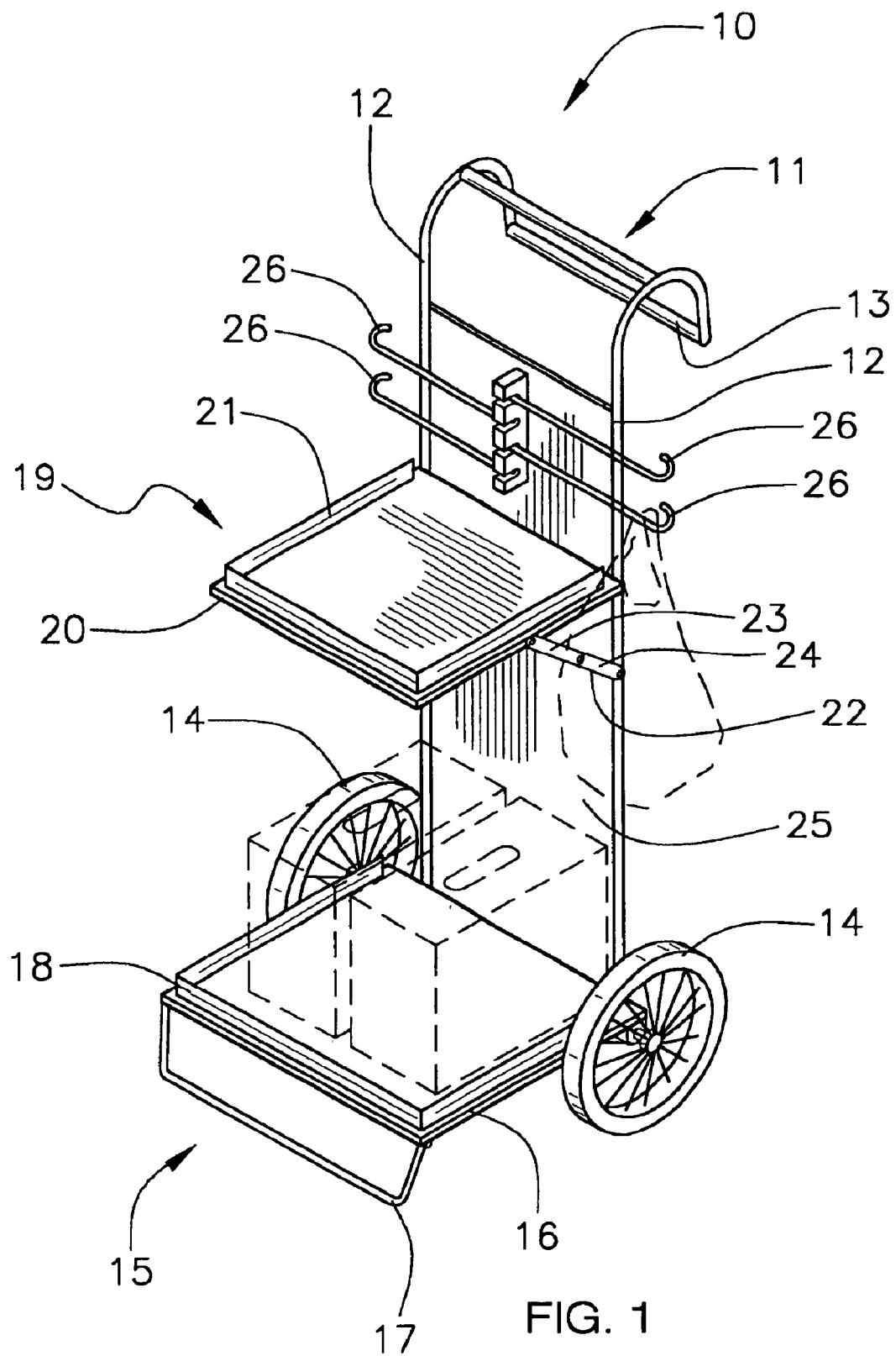
FIG. 1 is a front perspective view of a new hand cart according to the present invention shown in user.

With reference now to the drawings, and in particular to FIGS. 1 through 5 thereof, a new hand cart embodying the principles and concepts of the present invention and generally designated by the reference numeral 10 will be described.

As best illustrated in FIGS. 1 through 5, the hand cart 10 generally comprises a frame assembly 11 comprising a pair of side members 12 and a handle member 13. The handle member 13 extends between the side members 12. The handle member 13 is designed for being griped by hands of the user for moving the frame assembly 11 across a surface.

A plurality of wheels 14 are rotatably coupled to the side members 12 of the frame assembly 11. The wheels 14 are designed for rolling across the surface for facilitating movement of the frame assembly 11 across the surface when the frame assembly 11 is being moved by the user.

A lower shelf assembly 15 is hingably coupled to the frame assembly 11 opposite the handle member 13 of the frame assembly 11. The lower shelf assembly 15 is pivotal between a deployed position defined by the lower shelf assembly 15 being positioned substantially perpendicular to the frame assembly 11 and a stored position defined by the lower shelf assembly 15 being positioned substantially parallel to the frame assembly 11. The lower shelf assembly 15 is designed for receiving groceries for facilitating transportation of the groceries across the surface by the user when the lower shelf assembly 15 is in the deployed position.

The lower shelf assembly 15 comprises a platform member 16. The platform member 16 is hingably coupled to the side members 12 of the frame assembly 11. The platform member 16 is designed for supporting the groceries when the lower shelf assembly 15 is in the deployed position.

The lower shelf assembly 15 comprises a stabilizing bar 17. The stabilizing bar 17 is pivotally coupled to the platform member 16 of the lower shelf assembly 15 opposite the frame assembly 11 whereby the stabilizing bar 17 is positioned substantially perpendicular to the platform member 16 when the lower shelf assembly 15 is in the deployed position and substantially parallel to the platform member 16 when the lower shelf assembly 15 is in the stored position. The stabilizing bar 17 is designed for engaging the surface for stabilizing the lower shelf assembly 15 and the frame assembly 11 when the lower shelf assembly 15 is receiving groceries.

The lower shelf assembly 15 comprises a containment wall 18. The containment wall 18 is pivotally coupled to the platform member 16 whereby the containment wall 18 is positioned substantially perpendicular to the platform member 16 when the lower shelf assembly 15 is in the deployed position and the containment wall 18 is positioned substantially parallel to the platform member 16 when the lower shelf assembly 15 is in the stored position. The containment wall 18 is designed for inhibiting groceries placed on the lower shelf assembly 15 from sliding off of the platform member 16 when the frame assembly 11 is being moved. A living hinge may be used between the containment wall 18 and the platform member 16 to allow the containment wall 18 to pivot with respect to platform member 16.

An upper shelf assembly 19 is hingably coupled to the frame assembly 11 proximate the handle member 13 of the frame assembly 11. The upper shelf assembly 19 is pivotal between a deployed position defined by the upper shelf assembly 19 being positioned substantially perpendicular to the frame assembly 11 and a stored position defined by the upper shelf assembly 19 being positioned substantially parallel to the frame assembly 11. The upper shelf assembly 19 is designed for receiving groceries for facilitating transportation of the groceries across the surface by the user when the upper shelf assembly 19 is in the deployed position.

The upper shelf assembly 19 comprises a support plate 20. The support plate 20 is hingably coupled to the side members 12 of the frame assembly 11. The support plate 20 is designed for supporting the groceries when the upper shelf assembly 19 is in the deployed position.

The upper shelf assembly 19 comprises a blocking wall 21. The blocking wall 21 is pivotally coupled to the support plate 20 whereby the blocking wall 21 is positioned substantially perpendicular to the support plate 20 when the upper shelf assembly 19 is in the deployed position and the blocking wall 21 is positioned substantially parallel to the support plate 20 when the upper shelf assembly 19 is in the stored position. The blocking wall 21 is designed for inhibiting groceries placed on the upper shelf assembly 19 from sliding off of the support plate 20 when the frame assembly 11 is being moved. A living hinge may be used between the blocking wall 21 and the support plate 20 to allow for the blocking wall 21 to be pivoted with respect to the support plate 20.

The upper shelf assembly 19 comprises at least one linkage 22. The linkage 22 extends between the support plate 20 of the upper shelf assembly 19. and one of the side members 12 of the frame assembly 11. The linkage 22 is for selectively securing the support plate 20 in the deployed position for inhibiting pivoting of the support plate 20 with respect to the frame assembly 11 when the groceries are place on the support plate 20 of the upper shelf assembly 19.

The linkage 22 of the upper shelf assembly 19 comprises a first arm member 23 and a second arm member 24. The first arm member 23 is rotatably coupled to the support plate 20. The second arm member 24 is rotatably coupled to one of the side members 12 of the frame assembly 11. The first arm member 23 is rotatably coupled to the second arm member 24. The first arm member 23 is aligned with the second arm member 24 when the upper shelf assembly 19 is in the deployed position for inhibiting inadvertent pivoting of the support plate 20 with respect to the frame assembly 11. The support plate 20 of the upper shelf is pivotal with respect to the frame assembly 11 when the first arm member 23 is rotated with respect to the second arm member 24 for moving the first arm member 23 out of alignment with the second arm member 24.

A backing member 25 is coupled to the frame assembly 11 whereby the backing member 25 extends between the side members 12 of the frame assembly 11 opposite the handle member 13. The backing member 25 is designed for preventing groceries position on the lower shelf assembly 15 from sliding off of the lower shelf assembly 15 between the side members 12 of the frame assembly 11 when the frame assembly 11 is being moved by the user.

A plurality of hook members 26 are pivotally coupled to the backing member 25. The hook members 26 are positioned proximate the handle member 13 of the frame assembly 11. Each of the hook members 26 is pivotal with respect to the backing member 25 whereby a portion of the associated one of the hook members 26 extends beyond the frame assembly 11. Each of the hook members 26 is designed for receiving at least one bag of groceries when the hook members 26 are rotated with respect to the backing member 25.

Figure 4:
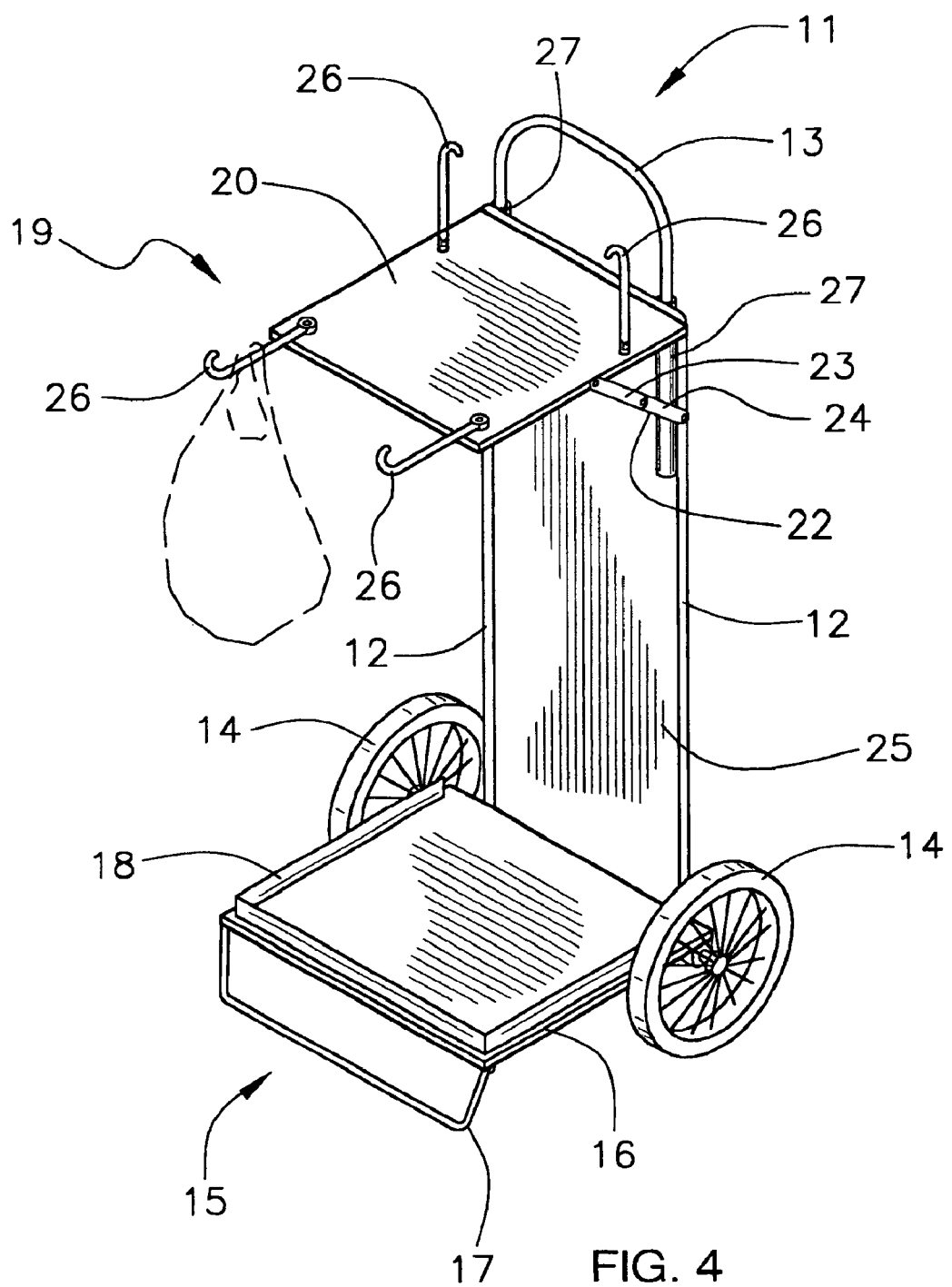
FIG. 4 is a front perspective view of an alternate embodiment of the present invention.

In an embodiment, as shown in FIG. 4, the hook members 26 are rotatably coupled the support plate 20 of the upper shelf assembly 19. Each of the hook members 26 is selectively rotated whereby a portion of the associated one of the hook members 26 extends beyond the support plate 20. Each of the hook members 26 is designed for receiving at least one bag of groceries when the hook members 26 are rotated with respect to the support plate 20. The frame assembly 11 comprises a pair of sleeve members 27. Each of the sleeve members 27 is coupled to one of the side members 12 of the frame assembly 11. The handle member 13 is selectively inserted into the sleeve members 27 when the user wishes to move the frame assembly 11 across the surface. The handle member 13 is selectively removable from the sleeve members 27 to facilitate storage.

Figure 5:
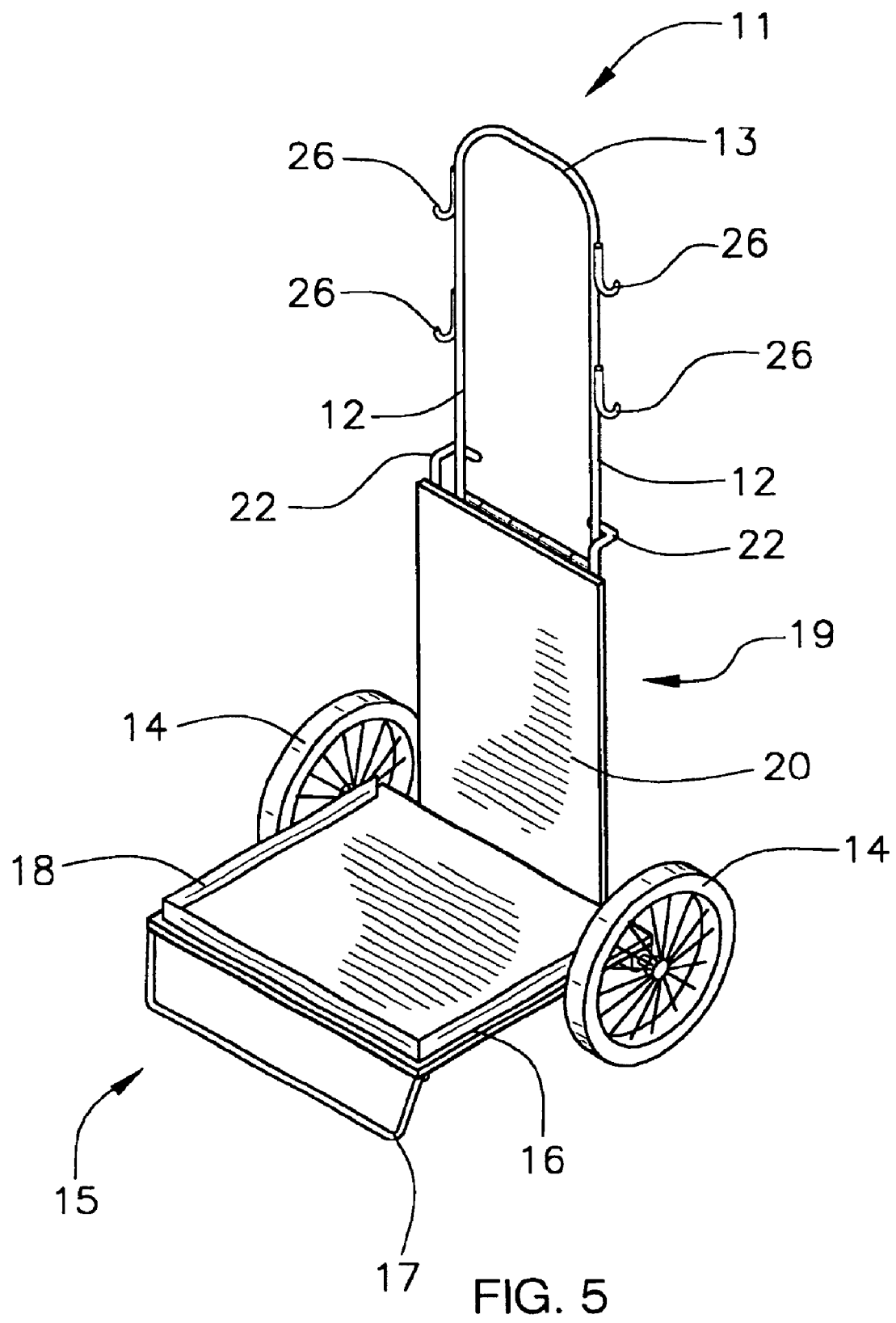
FIG. 5 is a front perspective view of another embodiment of the present invention.

In the embodiment, as shown in FIG. 5, the plurality of hook members 26 are coupled to the side members 12 of the frame assembly 11. The hook members 26 is positioned proximate the handle member 13 of the frame assembly 11. Each of the hook members 26 is designed for receiving at least one bag of groceries for supporting the groceries when the user is moving the frame assembly 11.

In use, the user pivots the lower shelf assembly 15 in to the deployed position and loads groceries onto the platform member 16 of the lower shelf assembly 15. The upper shelf portion is the pivoted with respect to the frame assembly 11 to allow the user to load groceries onto the support plate 20 of the upper shelf assembly 19. Each of the hook members 26 can be rotated with respect to the backing plate to allow the portion of the hook members 26 extending beyond the frame assembly 11 to be inserted through handles in the bags of groceries to allow the user to use the handle member 13 to move the groceries to the desired location. When the user has unloaded all the groceries the lower shelf assembly 15 and the upper shelf assembly 19 are pivoted to the stored position to allow for compact storage.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A hand cart for transporting articles by user, the hand cart comprising:

a frame assembly comprising a pair of side members and a handle member, said handle member extending between said side members, said handle member being adapted for being griped by hands of the user for moving said frame assembly across a surface;

a plurality of wheels being rotatably coupled to said side members of said frame assembly, said wheels being adapted for rolling across the surface for facilitating movement of said frame assembly across the surface when said frame assembly is being moved by the user;

a lower shelf assembly being hingably coupled to said frame assembly opposite said handle member of said frame assembly, said lower shelf assembly being pivotal between a deployed position defined by said lower shelf assembly being positioned substantially perpendicular to said frame assembly and a stored position defined by said lower shelf assembly being positioned substantially parallel to said frame assembly, said lower shelf assembly being adapted for receiving groceries for facilitating transportation of the groceries across the surface by the user when said lower shelf assembly is in the deployed position;

a backing member being coupled to said frame assembly such that said backing member extends between said side members of said frame assembly opposite said handle member, said backing member being adapted for preventing groceries position on said lower shelf assembly from sliding off of said lower shelf assemble between said side members of said frame assembly when said frame assembly is being moved by the user; and a plurality of hook members being pivotally coupled to said backing member, said hook members being positioned proximate said handle member of said frame assembly, each of said-hook members being pivotal in a plane substantially perpendicular to said backing member such that a portion of the associated one of said hook members extends beyond said frame assembly, a hook end of said hook members being substantially above one of said wheels when said hook members are pivoted with respect to said backing member, said hook end of each of said hook members being adapted for receiving at least one bag of groceries such that the bag is positioned over one of the wheels to position the weight of the bags over the wheels to inhibit tipping of said frame assembly when said hook members are rotated with respect to said backing member.

2. The hand cart as set forth it claim 1, further comprising:

said lower shelf assembly comprising a platform member, said platform member being hingably coupled to said side members of said frame assembly, said platform member being adapted for supporting the groceries when said lower shelf assembly is in the deployed position.

3. The hand cart as set forth in claim 2, further comprising:

said lower shelf assembly comprising a stabilizing bar, said stabilizing bar being pivotally coupled to said platform member of said lower shelf assembly opposite said frame assembly such that said stabilizing bar is positioned substantially perpendicular to said platform member when said lower shelf assembly is in the deployed position and substantially parallel to said platform member when said lower shelf assembly is in the stored position, said stabilizing bar being adapted for engaging the surface for stabilizing said lower shelf assembly and said frame assembly when said lower shelf assembly is receiving groceries.

4. The hand cart as set forth in claim 2, further comprising:

said lower shelf assembly comprising a containment wall, said containment wall being pivotally coupled to said platform member such that said containment wall is positioned substantially perpendicular to said platform member when said lower shelf assembly is in the deployed position and said containment wall being positioned substantially parallel to said platform member when said lower shelf assembly is in the stored position, said containment wall being adapted for inhibiting groceries placed on said lower shelf assembly from sliding off of said platform member when said frame assembly is being moved.

5. The hand cart as set forth in claim 1, further comprising:

an upper shelf assembly being hingably coupled to said frame assembly proximate said handle member of said frame assembly, said upper shelf assembly being pivotal between a deployed position defined by said upper shelf assembly being positioned substantially perpendicular to said frame assembly and a stored position defined by said upper shelf assembly being positioned substantially parallel to said frame assembly, said upper shelf assembly being adapted for receiving groceries for facilitating transportation of the groceries across the surface by the user when said upper shelf assembly is in the deployed position.

6. The hand cart as set forth in claim 5, further comprising:

said upper shelf assembly comprising a support plate, said support plate being hingably coupled to said side members of said frame assembly, said support plate being adapted for supporting the groceries when said upper shelf assembly is in the deployed position.

7. The hand cart as set forth in claim 6, further comprising:

said upper shelf assembly comprising a blocking wall, said blocking wall being pivotally coupled to said support plate such that said blocking wall is positioned substantially perpendicular to said support plate when said upper shelf assembly is in the deployed position and said blocking wall being positioned substantially parallel to said support plate when said upper shelf assembly is in the stored position, said blocking wall being adapted for inhibiting groceries placed on said upper shelf assembly from sliding off of said support plate when said frame assembly is being moved.

8. The hand cart as set forth in claim 6, further comprising:

said upper shelf assembly comprising at least one linkage, said linkage extending between said support plate of said upper shelf assembly and one of said side members of said frame assembly, said linkage being for selectively securing said support plate in the deployed position for inhibiting pivoting of said support plate with respect to said frame assembly when the groceries are place on said support plate of said upper shelf assembly.

9. The hand cart as set forth in claim 8, further comprising:
said linkage of said upper shelf assembly comprising a first arm member and a second arm member, said first arm member being rotatably coupled to said support plate, said second arm member being rotatably coupled to one of said side members of said frame assembly, said first arm member being rotatably coupled to said second arm member, said first arm member being aligned with said second arm member when said upper shelf assembly is in the deployed position for inhibiting inadvertent pivoting of said support plate with respect to said frame assembly, said support plate of said upper shelf being pivotal with respect to said frame assembly when said first arm member is rotated with respect to said second arm member for moving said first arm member out of alignment with said second arm member.

10. The hand cart as set forth in claim 6, further comprising:
said upper shelf assembly comprising a plurality of hook members, said hook members being rotatably coupled said support plate of said upper shelf assembly, each of said hook members being selectively rotated such that a portion of the associated one of said hook members extends beyond said support plate, each of said hook members being adapted for receiving at least one bag of groceries when said hook members are rotated with respect to said support plate.

11. The hand cart as set forth in claim 1, further comprising:
a plurality of hook members being coupled to said side members of said frame assembly, said hook members being positioned proximate said handle member of said frame assembly, each of said hook members being adapted for receiving at least one bag of groceries for supporting the groceries when the user is moving said frame assembly.

12. The hand cart as set forth in claim 1, further comprising:
said frame assembly comprising a pair of sleeve members, each of said sleeve members being coupled to one of said side members of said frame assembly, said handle member being selectively inserted into said sleeve members when the user wishes to move said frame assembly across the surface, said handle member being selectively removable from said sleeve members to facilitate storage.

13. A hand cart for transporting articles by user, the hand cart comprising:
a frame assembly comprising a pair of side members and a handle member, said handle member extending between said side members, said handle member being adapted for being griped by hands of the user for moving said frame assembly across a surface;
a plurality of wheels being rotatably coupled to said side members of said frame assembly, said wheels being adapted for rolling across the surface for facilitating movement of said frame assembly across the surface when said frame assembly is being moved by the user;
a lower shelf assembly being hingably coupled to said frame assembly opposite said handle member of said frame assembly, said lower shelf assembly being pivotal between a deployed position defined by said lower shelf assembly being positioned substantially perpendicular to said frame assembly and a stored position defined by said lower shelf assembly being positioned substantially parallel to said frame assembly, said lower shelf assembly being adapted for receiving groceries for facilitating transportation of the groceries across the surface by the user when said lower shelf assembly is in the deployed position;

said lower shelf assembly comprising a platform member, said platform member being hingably coupled to said side members of said frame assembly, said platform member being adapted for supporting the groceries when said lower shelf assembly is in the deployed position;

said lower shelf assembly comprising a stabilizing bar, said stabilizing bar being pivotally coupled to said platform member of said lower shelf assembly opposite said frame assembly such that said stabilizing bar is positioned substantially perpendicular to said platform member when said lower shelf assembly is in the deployed position and substantially parallel to said platform member when said lower shelf assembly is in the stored position, said stabilizing bar being adapted for engaging the surface for stabilizing said lower shelf assembly and said frame assembly when said lower shelf assembly is receiving groceries;

said lower shelf assembly comprising a containment wall, said containment wall being pivotally coupled to said platform member such that said containment wall is positioned substantially perpendicular to said platform member when said lower shelf assembly is in the deployed position and said containment wall being positioned substantially parallel to said platform member when said lower shelf assembly is in the stored position, said containment wall being adapted for inhibiting groceries placed on said lower shelf assembly from sliding off of said platform member when said frame assembly is being moved;

an upper shelf assembly being hingably coupled to said frame assembly proximate said handle member of said frame assembly, said upper shelf assembly being pivotal between a deployed position defined by said upper shelf assembly being positioned substantially perpendicular to said frame assembly and a stored position defined by said upper shelf assembly being positioned substantially parallel to said frame assembly, said upper shelf assembly being adapted for receiving groceries for facilitating transportation of the groceries across the surface by the user when said upper shelf assembly is in the deployed position;

said upper shelf assembly comprising a support plate, said support plate being hingably coupled to said side members of said frame assembly, said support plate being adapted for supporting the groceries when said upper shelf assembly is in the deployed position;

said upper shelf assembly comprising a blocking wall, said blocking wall being pivotally coupled to said support plate such that said blocking wall is positioned substantially perpendicular to said support plate when said upper shelf assembly is in the deployed position and said blocking wall being positioned substantially parallel to said support plate when said upper shelf assembly is in the stored position, said blocking wall being adapted for inhibiting groceries placed on said upper shelf assembly from sliding off of said support plate when said frame assembly is being moved;

said upper shelf assembly comprising at least one linkage, said linkage extending between said support plate of said upper shelf assembly and one of said side members of said frame assembly, said linkage being for selectively securing said support plate in the deployed position for inhibiting pivoting of said support plate with respect to said frame assembly when the groceries are place on said support plate of said upper shelf assembly;

said linkage of said upper shelf assembly comprising a first arm member and a second arm member, said first arm member being rotatably coupled to said support plate, said second arm member being rotatably coupled to one of said side members of said frame assembly, said first arm member being rotatably coupled to said second arm member, said first arm member being aligned with said second arm member when said upper shelf assembly is in the deployed position for inhibiting inadvertent pivoting of said support plate with respect to said frame assembly, said support plate of said upper shelf being pivotal with respect to said frame assembly when said first arm member is rotated with respect to said second arm member for moving said first arm member out of alignment with said second arm member;

a backing member being coupled to said frame assembly such that said backing member extends between said side members of said frame assembly opposite said handle member, said backing member being adapted for preventing groceries position on said lower shelf assembly from sliding off of said lower shelf assembly between said side members of said frame assembly when said frame assembly is being moved by the user; and a plurality of hook members being pivotally coupled to said backing member, said hook members being positioned proximate said handle member of said frame assembly, each of said hook members being pivotal in a plane substantially perpendicular to said backing member such that a portion of the associated one of said hook members extends beyond said frame assembly, a hook end of said hook members being substantially above one of said wheels when said hook members are pivoted with respect to said backing member, said hook end of each of said hook members being adapted for receiving at least one bag of groceries such that the bag is positioned over one of the wheels to position the weight of the bags over the wheels to inhibit tipping of said frame assembly when said hook members are rotated with respect to said backing member.

* * * * *